United States Patent
He et al.

(10) Patent No.: US 11,387,681 B2
(45) Date of Patent: Jul. 12, 2022

(54) CHARGING STATION FOR MOBILE DEVICE WITH SOLAR PANEL

(71) Applicant: UTICA LEASECO, LLC, Rochester Hills, MI (US)

(72) Inventors: Gang He, Cupertino, CA (US); Brendan Kayes, Los Gatos, CA (US); Christopher France, Sunnyvale, CA (US)

(73) Assignee: UTICA LEASECO, LLC, Rochester Hills, MI (US)

( * ) Notice: Subject to any disclaimer, the term of this patent is extended or adjusted under 35 U.S.C. 154(b) by 539 days.

(21) Appl. No.: 15/809,576

(22) Filed: Nov. 10, 2017

(65) Prior Publication Data

US 2018/0076654 A1  Mar. 15, 2018

Related U.S. Application Data

(63) Continuation of application No. 14/989,659, filed on Jan. 6, 2016, now Pat. No. 9,853,489.

(Continued)

(51) Int. Cl.
*H02J 50/30* (2016.01)
*H02J 7/35* (2006.01)
(Continued)

(52) U.S. Cl.
CPC ............ *H02J 50/30* (2016.02); *H02J 7/0036* (2013.01); *H02J 7/0044* (2013.01); *H02J 7/025* (2013.01); *H02J 7/35* (2013.01); *H02J 50/90* (2016.02)

(58) Field of Classification Search
CPC .... H02J 7/035; H02J 7/35; H02J 7/355; H02J 50/10–90; H02J 2007/0001; H02J 50/30; H02J 7/0036; H02J 7/0044; H02J 7/025
(Continued)

(56) References Cited

U.S. PATENT DOCUMENTS 6,707,274 B1 * 3/2004 Karr .................. H01M 10/46
320/107
8,248,026 B2  8/2012 Sip
(Continued)

FOREIGN PATENT DOCUMENTS

CN  102385305 A  3/2012
CN  203056618 U  7/2013
(Continued)

OTHER PUBLICATIONS

International Search Report and Written Opinion issued in International Patent Application No. PCT/US2016/039417 dated Oct. 24, 2016, 10 pages.
(Continued)

*Primary Examiner* — Richard Isla
*Assistant Examiner* — Manuel Hernandez
(74) *Attorney, Agent, or Firm* — ArentFox Schiff LLP

(57) ABSTRACT

A charging device configured to charge a mobile device through the solar cells integrated on the mobile device. The charging device converts wall power to light energy which can be absorbed by the solar cells and then converted to electricity for storage in the rechargeable battery of the mobile device. The charging device includes a light source configured to emit a light beam having a spectrum tuned to the spectral response of the solar cells. The charging device includes a proximity sensor for detecting the presence of a mobile device within the charging device housing and responsively signaling the activation of the light source. The charging device includes logic for wirelessly communicating with the mobile device as well as controlling the charging process in various stages and aspects. The light source may be LEDs that also serve to transmit light communication signals to the mobile device.

15 Claims, 3 Drawing Sheets

Related U.S. Application Data

(60) Provisional application No. 62/106,636, filed on Jan. 22, 2015.

(51) Int. Cl.
*H02J 50/90* (2016.01)
*H02J 7/00* (2006.01)
*H02J 7/02* (2016.01)

(58) Field of Classification Search
USPC .................. 320/101, 107, 108, 114, 115
See application file for complete search history.

(56) References Cited

U.S. PATENT DOCUMENTS

| | | | |
|---|---|---|---|
| 8,742,720 | B2 | 6/2014 | Kirtley et al. |
| 9,012,764 | B1 | 4/2015 | Zommer |
| 2004/0196880 | A1 | 10/2004 | Asada |
| 2007/0069684 | A1* | 3/2007 | Ramsden ............... H02J 7/355 320/101 |
| 2007/0114967 | A1* | 5/2007 | Peng ................... H02J 50/90 320/101 |
| 2008/0081178 | A1 | 4/2008 | Hinotsu et al. |
| 2009/0046269 | A1 | 2/2009 | Essling |
| 2009/0273309 | A1* | 11/2009 | Kuo ..................... H02J 7/35 320/101 |
| 2011/0111173 | A1 | 5/2011 | Ogawa et al. |
| 2011/0140540 | A1* | 6/2011 | Chu .................... H02J 50/20 307/104 |
| 2012/0098481 | A1 | 4/2012 | Hunter et al. |
| 2013/0020996 | A1 | 1/2013 | Kirtley et al. |
| 2013/0249481 | A1 | 9/2013 | Jacobs et al. |
| 2014/0132201 | A1* | 5/2014 | Tsang .................. H02J 50/30 320/107 |
| 2014/0176042 | A1* | 6/2014 | Sheu ................... H02J 7/00 320/101 |
| 2014/0217957 | A1 | 8/2014 | Mack |
| 2014/0265998 | A1* | 9/2014 | Nielson ............... H02J 7/0047 320/101 |
| 2015/0091495 | A1 | 4/2015 | Mahameed et al. |
| 2015/0162781 | A1* | 6/2015 | Fratti .................. H02J 7/025 320/101 |
| 2015/0270742 | A1 | 9/2015 | Macwilliams et al. |
| 2015/0280488 | A1* | 10/2015 | Wyrwas ............... H02J 7/35 320/101 |
| 2015/0303732 | A1* | 10/2015 | Dow ................... H02J 50/00 320/108 |
| 2016/0087484 | A1* | 3/2016 | Kim .................... H02J 7/025 320/101 |
| 2016/0127875 | A1 | 5/2016 | Zampini |
| 2016/0218550 | A1* | 7/2016 | MacWilliams ......... H02J 7/35 |
| 2017/0093228 | A1* | 3/2017 | Fisher .................. H02J 7/35 |

FOREIGN PATENT DOCUMENTS

| | | |
|---|---|---|
| CN | 203562832 U | 4/2014 |
| EP | 0031724 A2 | 7/1981 |
| JP | 2006120998 A | 5/2006 |
| WO | 2014046810 A1 | 3/2014 |

OTHER PUBLICATIONS

International Search Report and Written Opinion issued in International Patent Application No. PCT/US2016039411 dated Jan. 12, 2017, 8 pages.
China Notification of First Office Action corresponding to Chinese Application No. 201680006837.4, dated Aug. 5, 2019.
Written Opinion Issued in International Patent Application No. PCT/US2016/014508 dated Dec. 13, 2016 (6 pages).
International Search Report and Written Opinion Issued in International Application No. PCT/US2016/014508 dated Ma 4, 2016 (11 pages).
AutoCharge: Automatically Charge Smartphones Using a Light Beam; Yunxin Liu, Zhen Qin, Chunshui Zhao; Microsoft Research, Beijing 100080, China; pp. 1-12.

\* cited by examiner

CHARGING STATION FOR MOBILE DEVICE WITH SOLAR PANEL

CROSS REFERENCE

This application is a continuation of U.S. Non-Provisional patent application Ser. No. 14/989,659, filed on Jan. 6, 2016, titled "CHARGING STATION FOR MOBILE DEVICE WITH SOLAR PANEL," which claims priority and benefit to U.S. Provisional Patent Application No. 62/106,636, filed on Jan. 22, 2015, titled "LIGHT CHARGING DOCK FOR CHARGING MOBILE DEVICE WITH SOLAR CELL," all of which are herein incorporated by reference in their entireties.

TECHNICAL FIELD

The present disclosure relates generally to the field of mobile devices, and, more specifically, to the field of charging accessories for mobile devices.

BACKGROUND OF THE INVENTION

The density and speed of integrated circuit elements have steadily and exponentially increased for several decades, allowing for ever faster processing speeds, greater data handling capabilities, increasing storage capacity, and smaller physical dimensions of mobile electronic devices, such as smart phones, tablets, media players, global positioning system (GPS) and personal digital assistants (PDAs). With the ever increased amount of information available on computer networks as well as mobile devices' processing power and their abilities to provide access to data, users have become accustomed to using mobile devices at any desired location for prolonged times.

Wireless charging is gaining attentions from the mobile device manufacturing industries, such as inductively charging and solar charging. In contrast to traditional wired chargers, a wireless charger does not require metal coupling mechanisms (e.g., electrodes on the sockets) for transferring power from the charger to a mobile device being charged. Thus, wireless charging approaches potentially enable the development of water-proof mobile devices.

Mobile devices integrated with solar cells can be charged when the solar cells are exposed to sunlight or other ambient light. Solar charging offers a wireless, clean, cost-effective and convenient charging approach. However, solar charging efficacy is largely contingent on the intensity of and the exposure time to the ambient light, which sometimes cannot meet the users' requirements for reliable and consistent charging, e.g., in a raining or cloudy day or in the night. Currently, mobile devices with solar cells have to preserve the capabilities of wired charging for rapid charging, especially when the ambient light intensity is insufficient for solar charging. Wired charging dictates user accessibility to the electrode interfaces for connection to wall power, which may complicate efforts to make the device housing water-proof.

SUMMARY OF THE INVENTION

Provided herein are wireless charging mechanisms for mobile devices with solar cells even when ambient light are limited or unavailable.

Embodiments of the present disclosure provide a charging device configured to convert wall power to light energy which can be absorbed by the solar cells (or photovoltaic cells) installed on a mobile device and then converted to electricity for storage in the rechargeable battery of the mobile device. The charging device includes a light source configured to emit light beams with a spectrum tuned to the spectral response of the solar cells, thereby achieving a photovoltaic efficiency exceeding that of solar charging by ambient light. The intensity of the light source can also be increased to increase the power density of the light received by the photovoltaic cells, relative to ambient light. The housing of the charging device is designed to accommodate a mobile device placed therein with the solar cells facing the light source. The charging device includes a proximity sensor for detecting the presence of a mobile device within the hosing of the charging device and sending corresponding signals to trigger the activation of the light source. The charging device is equipped with logic for wirelessly communicating with the mobile device as well as controlling the charging process in various stages and aspects. In some embodiments, the light source includes light emitting diodes (LEDs) composed of the same or similar material with the solar cells on a receiving mobile device. These LED light source may also operate to generate light signals for communication with the receiving mobile device.

Because the charging device provides a light beam directed to and tuned to the solar cells on a mobile device, the mobile device can be charged at speeds and efficiencies that are comparable to conventional wired charging. In addition, the wireless charging process is reliable and consistent as it is unlimited by ambient light availability or intensity. Therefore, it is possible that wired charging for a mobile device can be replaced by wireless charging for which metal coupling mechanisms on the mobile device housing are no longer necessary. With the elimination of metal contacts on the mobile device housing, the mobile device can be more easily designed to be water-proof.

According to one embodiment, a charging device includes a housing configured to accommodate a mobile device having a solar cell, a light source, and a wall power adaptor. The light source is coupled to the housing and configured to emit a light beam for radiating the solar cell. The solar cell is operable to convert the light beam to electricity for storage in a rechargeable battery of the mobile device. The wall power adaptor is configured to convert wall power to an electrical voltage supplied to the light source.

The foregoing is a summary and thus contains, by necessity, simplifications, generalization and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Figure 1:
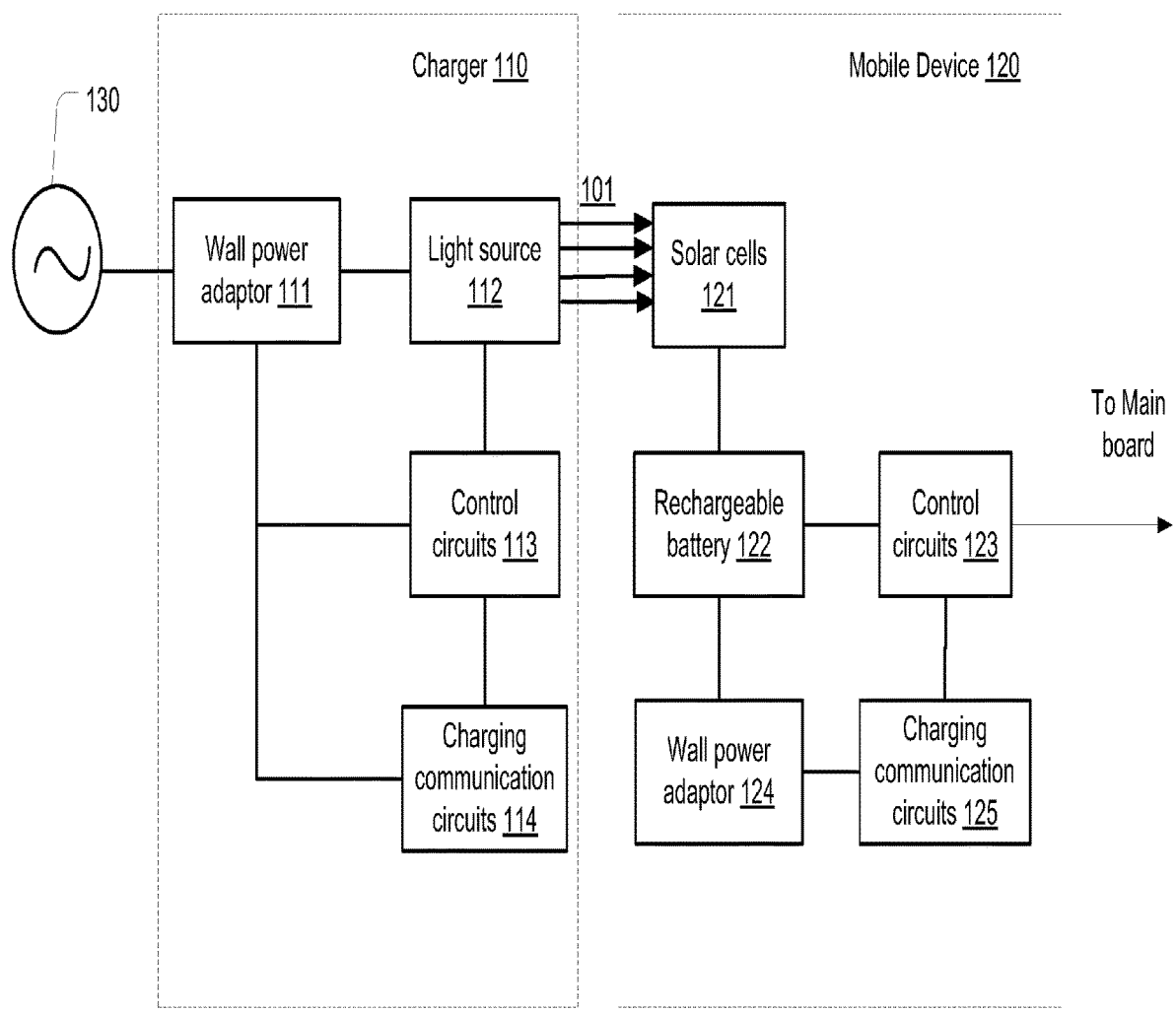
FIG. 1 is a block diagram illustrating the configuration of an exemplary charging device capable of generating light for radiating the solar cells integrated on a mobile device according to an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Charging Station for Mobile Device with Solar Panel

Overall, embodiments of the present disclosure provide a charging station configured to draw wall power via an electrical line and generate a light beam directed to charging a mobile device through its photovoltaic (PV) panel having a plurality of PV cells. The light source in the charging station is selected based on the characteristics of the solar cells to achieve high PV efficiency. The charging station can be designed to be generic to a variety of mobile device products or specific to a particular model. The charging station includes communication and control logic used to automatically control a charging process based on communications with a mobile device placed therein. In some embodiments, the charging station is equipped with light emitting diodes (LED) which can serve as the light source for charging and/or a light signal generator for communication with a receiving mobile device.

Herein, the terms "solar panel," and "photovoltaic (PV) panel" are used interchangeably; the terms "solar cell," and "PV cell" are used interchangeably; and the terms "charger," "charging station," "charging device," and "charging dock" are used interchangeably.

FIG. 1 is a block diagram illustrating the configuration of an exemplary charger 110 capable of generating a light beam for radiating the solar cells 121 integrated on a mobile device 120 according to an embodiment of the present disclosure. The mobile device 120 includes the solar cells 121, a rechargeable battery 122, an optional wall power adaptor 124, control circuits 123 and charging communication circuits 125. The control circuits 123 and charging communication circuits 125 are coupled to the main board of the mobile device 120. The solar cells 121 are assembled into a solar panel and installed on the housing of the mobile device 120. The charger 110 includes a wall power adaptor 111, a light source 112, control circuits 113 and charging communication circuits 114. The mobile device 120 and the charger device 110 are placed proximate to each other with the solar cells 121 facing the light source 112 to facilitate transfer of light energy provided by the light source 112.

During a charging process, the wall power adaptor 111 of the charger 110 converts the wall power 130 to a suitable power supplied to the light source 112. The light source 112 generates a light beam 101 directed to the solar cells 121. The solar cells 121 converts the incident light to an electrical current that is supplied to the rechargeable battery 122 for storage.

The present disclosure is not limited by the type, configuration, or electrical properties of a light source in a wireless charger for generating a light beam; nor is it limited by the wavelengths, dimension, or light intensity generated by the light source. A charger according to the present disclosure may be used to charge through crystalline silicon solar cells, thin films solar cells, multi junction solar cells, etc. The mobile device may be a phone, a Global Positioning System (GPS), a watch, a tablet or touchpad, a media player, a remote control, a PDA or any other suitable electronic devices equipped with a solar panel.

In some embodiments, the charger 110 and its light source 112 are customized for a particular type of mobile devices. To achieve a high energy conversion efficiency, it is preferred that the light beam spectrum is selected based on the material and structural characteristics of the solar cells 121, or tuned to the spectral response of the solar cells 121. In one embodiment, the light source 112 outputs light in a power range of 2 W-5 W.

In some embodiments, the light source 112 includes an electroluminescent material. For example, with respect to mobile devices equipped with GaAs solar cells on a plastic substrate, GaAs-based light-emitting diodes (LEDs) is a preferred light source as it provides a matching spectrum to the GaAs solar cells. For instance, the LED light source may use the same type of GaAs solar cells as used on the receiving mobile device. As described in greater detail below, such LED light source may also serve as a signal generator for communication with a receiving mobile device.

In some other embodiments, the charger 110 is designed to be generic to mobile devices of varying solar cell material and structural properties. For example, infrared light is generated and used to radiate the solar cells due to its invisibility and thus non-disturbance to human eyes as well as high absorption rates to most types of solar cells. Infrared light output from the charger 110 may be mixed with visible light used to inform users that light charging is in progress. It will be appreciated that a charger according to the present disclosure may include an array of light sources arranged in a pattern, for example to achieve a uniform radiation distribution on the solar panel. The charger 110 may include a single type of light source for charging various types of solar cells potentially in different efficiencies. In one embodiment, the light emitted from the light source 112 has a spectrum within the range of 800 nm .about. 1000 nm.

Alternatively, an array of light sources may include multiple types of light sources, each tuned to the spectral response of a particular type of solar cells. For instance, once the mobile device 120 is placed in the charger 110, the charger 110 can acquire information related to the solar cells 121 through communications with the mobile device 120. Accordingly, the control circuits 113 selectively activate the corresponding light sources to achieve an optimal conversion efficiency. For instance, upon detection that a receiving device is installed with GaAs or CdTe solar cells, a light source having the spectrum of 800 nm .about.860 nm may be activated. Upon detection that a receiving device is installed with Si or CIGS solar cells, a light source having the spectrum of 800 nm .about.1000 nm may be activated.

As described below, the control circuits 113 can control charging processes in various stages and aspects. For instance, the control circuits 113 are implemented using the maximum power point tracking (MPPT) technique. A control operation may be based on a communication between the charger 110 and the mobile device 120 through the respective communication circuits 114 and 125.

In the illustrated example, the mobile device 120 preserves the capability of being charged using an electrical charger in addition to being charged through the solar cells. The rechargeable battery 122 in the mobile device 120 is coupled to a wall power adaptor 124 which, when plugged to a wall power outlet, supplies an electrical current to charge the mobile device 120 directly using wall power. The rechargeable battery 122 and the wall power adaptor 124 are both coupled to and controlled by charging control circuits 123 in a variety of manners that are well known in the art.

According to the present disclosure, because the charging device provides a light beam tuned to the solar cell properties and directed onto the solar cells of a mobile device placed in proximity, the mobile device can be charged rapidly and efficiently in a wireless fashion. When the mobile device is placed on the charging device for charging, the light beam may be mostly or completely covered by the mobile device and so will pose no harm to the eyes of the people nearby. In addition, the wireless charging process is reliable and consistent as it is unlimited by ambient light availability or intensity. Therefore, it is possible that wired charging functionalities for a mobile device are no long needed. With the elimination of electrode interfaces on the housing, a mobile device can be more easily designed as water-proof.

Figure 2:
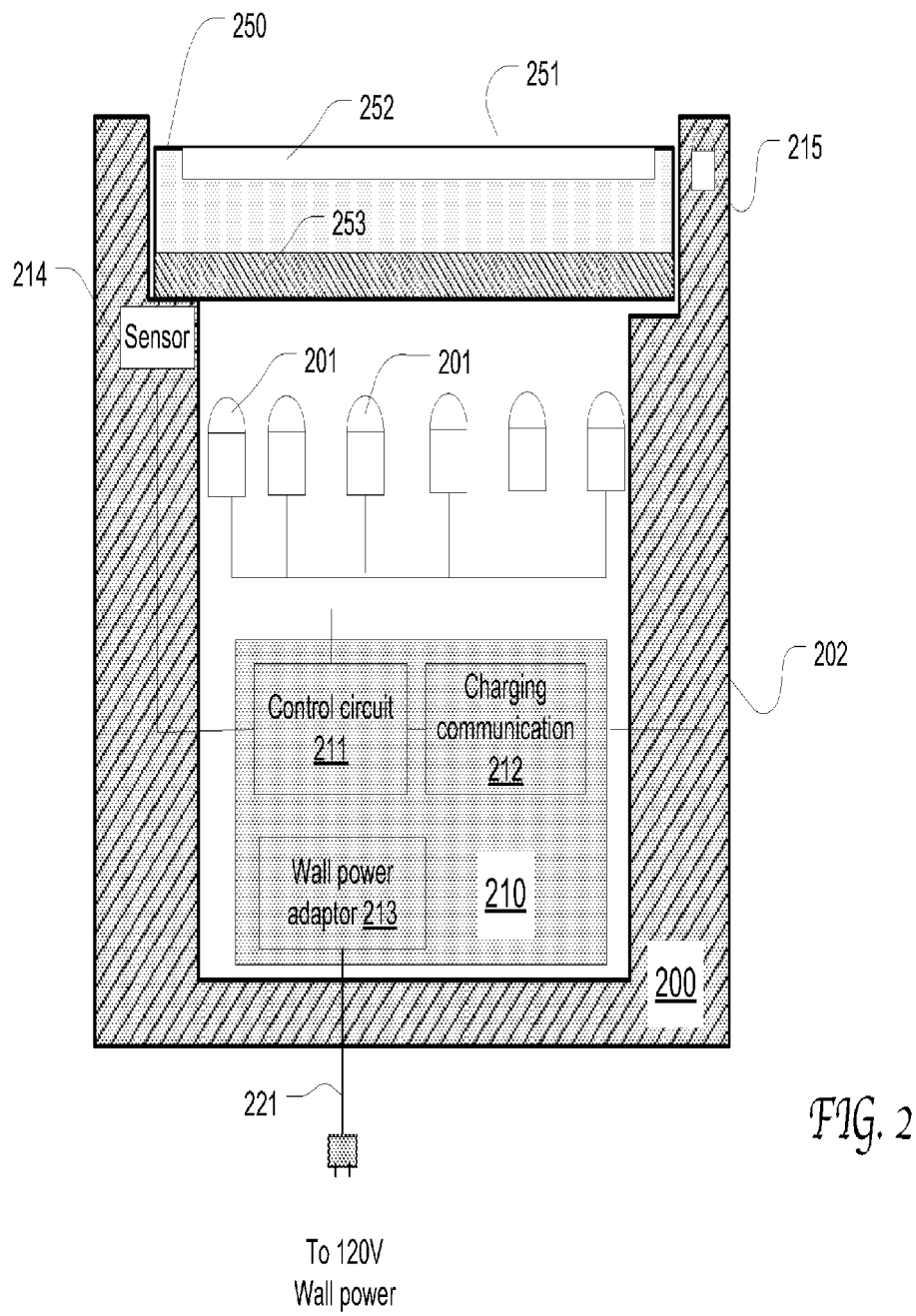
FIG. 2 illustrates an exemplary charging dock coupled with a mobile device for charging it with directed light in accordance with an embodiment of the present disclosure.

FIG. 2 illustrates an exemplary charging dock 200 coupled with a mobile device 250 for charging it with directed light in accordance with an embodiment of the present disclosure. The mobile device 250 has a display panel 252 on the front side and a solar panel 253 on the back cover. During operation, the charging dock 200 draws wall power through the connection cable 221 and transforms the wall power to an appropriate DC power used to drive the array of light sources 201.

The charging dock 200 has an exterior housing 202 and a receptacle 251 customized based on the physical attributes of the mobile device 250. The receptacle 251 has a rectangular shape conformal to the geometry of the mobile device 250. A user can simply place the mobile device 250 in the receptacle 251 with the solar panel 253 facing the light sources 201. For instance, the mobile device 250 may be situated a few centimeters away from the light sources 201 during charging. In one embodiment, the receptacle 251 supports the mobile device 250 in the horizontal orientation. In the illustrated example, the mobile device 250 fits in the receptacle without the need for a user adjusting its positioning. However, the charging dock 200 can be designed in any other suitable configuration or orientation. For example, a fastening means may be used to secure the mobile device 250 onto the charging dock rather than loosely sit on the charging dock 200.

In some other embodiments, a charging dock for charging mobile devices through solar cells has an adjustable receptacle and is capable of accommodating a variety of mobile devices of different dimensions. A charging dock may also include a housing cover used to prevent light leak to the ambient environment. The charging dock may be capable of detecting the dimension of a mobile device placed thereon. Based on the detected dimension, the control circuits can turn on selected light sources 201. For instance, for a small mobile device, only the center members of the light source array 201 are turned on to cover the entire solar panel for efficient charging, while the rest of the light sources remain off to save energy.

In addition to the light sources 201, the charging dock includes a proximity sensor 214, an indicator light 215, a printed circuit board (PCB) 210 that integrates the control circuits 211, the charging communication circuits 212 and the wall adaptor 213. The light sources 201 are coupled to the PCB 210. The wall adaptor 213 is coupled to the electrical cable 221 for connection with a wall power outlet. The various components in the charging dock can be implemented in any suitable way that is well known in the art.

When the mobile device 250 is placed on the charging dock 200, the proximity sensor 214 detects its presence and sends a signal to the control circuits 211. In response, the control circuits activate the light sources 201 to generate light beams. It is known that some types of LED solar cells can operate in different modes depending on the bias voltage. Particularly, such an LED solar cell can emit light when forward biased, and absorb light and convert it to electrical energy when reverse biased. Thus, in some embodiments, the light sources 201 include electroluminescent materials, e.g., GaAs, InGaAs, InGaP, AlGaAs, combinations thereof, or other III-V compound materials. Accordingly, the control circuits 211 cause a forward bias voltage to be applied on the light sources 201 during charging.

In some embodiments, in addition to a sensor that detects the proximity of the device, the charging dock 200 is able detect incorrect placement of the mobile device. In other embodiments the proximity sensor itself is also able to detect incorrect placement of the mobile device. For example, the charging dock may be able to detect if not all of the light sources 201 are covered by the mobile device. In this situation the charging dock 200 may leave some or all of the light sources 201 deactivated. This may reduce any safety risk associated with the possibility of the light beams from the light sources 201 escaping from the housing of the charging dock 200.

In some embodiments the solar panel 253 itself serves as the sensor that determines whether or not the mobile device has been correctly placed. For example, the proximity sensor 214 may detect the proximity of the mobile device, causing activation of some or all of the light sources 201. The mobile charging dock may then be able to detect a change in the property of the mobile device 250 and its associated solar panel 253 and use that to determine whether the placement of the mobile device is correct or not. For example, in one embodiment, the photogenerated current or voltage or the short-circuit current generated in the solar panel can indicate whether or not the placement is correct, as that is a predictable function of solar panel size and external quantum efficiency, and the intensity and spectrum of the light beams emitted by the light sources 201. In another embodiment a different property of the solar panel may be used to determine correct placement, for example the open-circuit voltage, or the intensity of the photoluminescence of the solar panel.

In some embodiments the sensing technique that indicates correct placement can also be used to turn off the light sources 201 when the mobile device is removed from the charging dock 200. In other embodiments the proximity sensor 214 provides for the function.

The charging dock 200 may include an optical train (not shown) operable to guide and/or distribute the light beams efficiently and evenly to the solar panel 253. When the mobile device 250 is removed from the receptacle 251, the proximity sensor 214 detects the departure and sends another signal to the control circuits 211 for switching off the light sources 201. The indicator light 215 is installed proximate to the receptacle 215 and serves to send indications to users regarding the charging status, e.g., in progress, complete or denied.

The communication circuits 212 can communicate with the mobile device 250 with regards to charging, such as the characteristics of the solar cells, the model of the mobile device, the usage status of the battery in the mobile device, the intensity and spectrum of the generated light, etc. Based on the communications, the control circuits 211 control the operations of the light sources 201, as described in detail with reference to FIG. 3.

In some embodiments, the communication functionalities are implemented using respective wireless communication circuits in the charging dock and the mobile device. In this case, the charging dock and the mobile device communicate via Bluetooth, a wide area network (WAN), a WiFi, a local area network (LAN), etc.

In some other embodiments, one or more light sources in the charging dock are configured as a transmitter and operable to send signals encoded as a sequence of light pulses in a binary form ("ONs" and "OFFs") to the mobile device. For example, the light sources are composed of LED-type solar cells (e.g., GaAs solar cells) which emit light when subject to a reverse bias. The communication circuits 212 control the reverse bias on the light sources to control the signal generation.

The solar cells on the mobile device may be able to emit light signals as well when subject to a reverse bias. For example, a GaAs solar cell emits light under a reverse bias and may be configured as a signal transmitter that can also send signals encoded as a sequence of light pulses in a binary form to the charging dock. In this manner, a two-way communication between the charging dock and the mobile device can be established through light signals transmitted from the LED-type solar cells on both sides.

Figure 3:
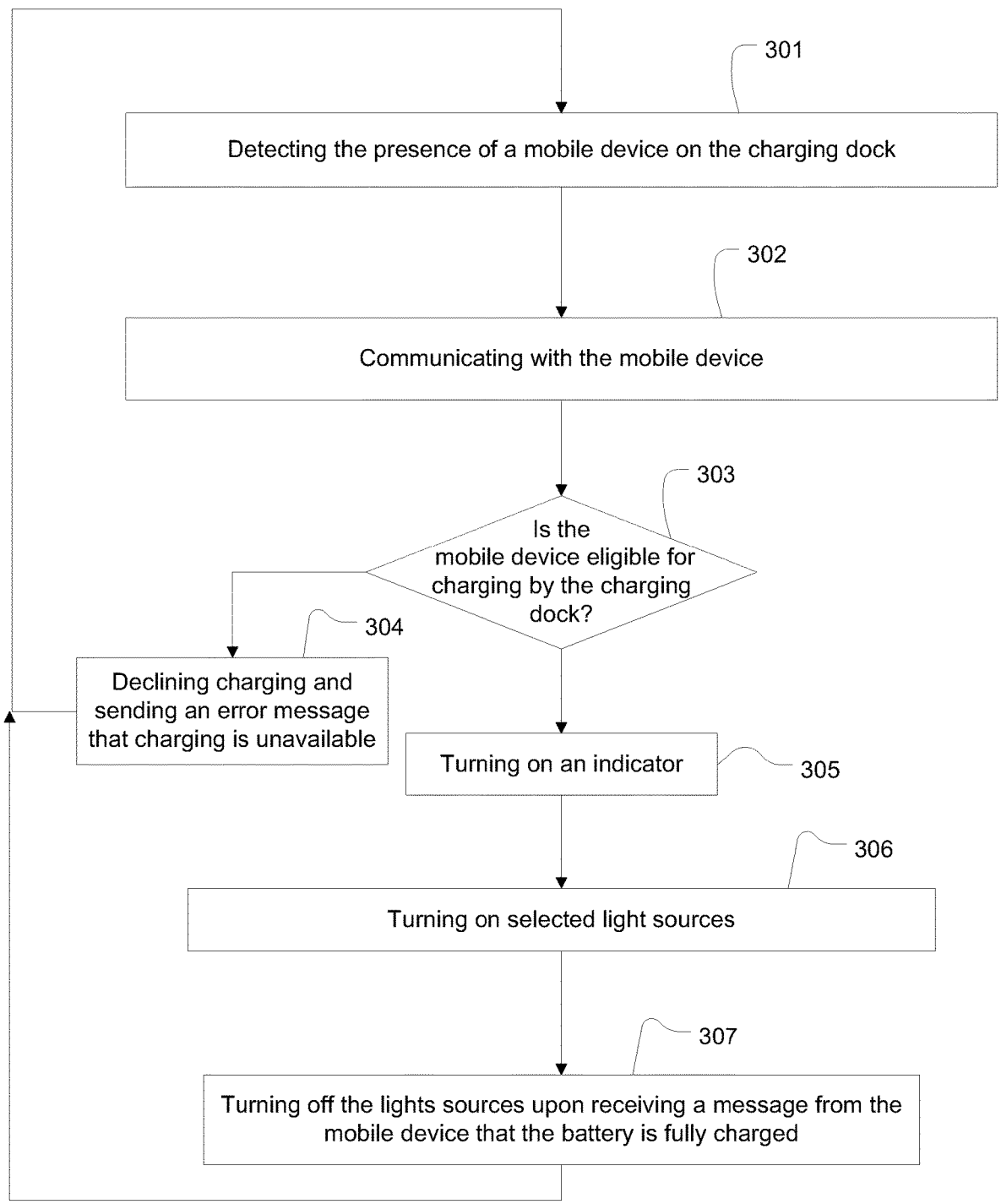
FIG. 3 is a flow chart depicting an exemplary charging process using a charging dock in accordance with an embodiment of the present disclosure.

FIG. 3 is a flow chart depicting an exemplary charging process 300 using a charging dock in accordance with an embodiment of the present disclosure. At 301, the proximity sensor detects the presence of a mobile device on the charging dock and sends a corresponding signal to the control circuits in the charging dock. At 302, the charging device communicates with the mobile device regarding the charging process. For example, the light source can send a light signal informing the mobile device as to output light intensity, light wavelength, light source type, and alike. The mobile device can send a message to the charging dock regarding the material and structural properties of its solar cells, mobile device model, battery usage status, and etc. In one embodiment, the mobile device may be configured to only accept light charging from light in a specified spectrum and intensity range.

Based on the message sent from the charging dock and through the control circuits 123 in FIG. 1, the mobile device may reject charging if the light source in the charging dock is unrecognized or the light intensity provided by the light source is out of an acceptable range. If the mobile device is already fully charged, the mobile device rejects charging from the charging dock.

Likewise, based on the message sent from the mobile device, the charging dock can determine if the mobile device is eligible for charging at 303. If the mobile device is an unrecognized model or otherwise ineligible for charging, at 304, the charging dock declines charging and sends an error message to the mobile device informing that charging is unavailable. If eligible, at 305, the indicator on the charging dock is turned on to notify users that charging is in progress.

The mobile device may also inform the charging dock of a desired range of light intensity. In response, the control circuits of the charging dock adjust the power supplied to all the lights sources to the requested range or activate selected light sources to obtain the request intensity level at 306. At 307, the mobile device sends a message to the charging dock when the battery is fully charged. In response, the control circuits of the charging dock switch off of the light sources and the charging dock enters into a standby or idle state. The foregoing processes 301-307 are repeated each time a mobile device is coupled to the charging dock for charging.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of charging a mobile device that has a solar cell, the method comprising:
    detecting, by a proximity sensor of a charging dock, a presence of the mobile device at the charging dock;
    activating, by the charging dock in response to the detecting the presence of the mobile device, a light source of one or more light sources of the charging dock to generate a light beam for irradiating the solar cell, the solar cell being operable to convert the light beam to electrical energy for storage in a rechargeable battery of the mobile device;

receiving, by the charging dock in response to the activating the light source, information from the mobile device indicating a characteristic of the solar cell based on placement of the solar cell in relation to the light source;

determining, by the charging dock in response to the receiving the information, whether the mobile device is correctly placed on the charging dock or incorrectly placed on the charging dock by monitoring a photogenerated current or voltage of the solar cell;

charging, by the charging dock in response to the determining the mobile device is correctly placed on the charging dock, the mobile device via the one or more light sources; and indicating, by the charging dock in response to the determining the mobile device is incorrectly placed on the charging dock, to the mobile device that the mobile device is incorrectly placed on the charging dock.

2. The method of claim 1, further comprising:
receiving a battery signal transmitted from the mobile device to the charging dock, wherein the battery signal indicates that the rechargeable battery is fully charged; and
deactivating the light source responsive to the battery signal.

3. The method of claim 1, further comprising:
declining charging the mobile device upon determining that the characteristic is indicative that the solar cell is ineligible for charging by the charging dock.

4. The method of claim 1, further comprising:
selecting the light source from a plurality of light sources of the charging dock based on the characteristic.

5. The method of claim 1, further comprising:
sending a signal from the charging dock to the mobile device regarding characteristics of the light beam, wherein the signal is emitted from the light source and is encoded as a sequence of light pulses in a binary form.

6. The method of claim 5, wherein the light source comprises light emitting diode (LED) material, and wherein the solar cell comprises the LED material.

7. A charging device comprising:
a housing configured to accommodate a mobile device that has a solar cell;
a sensor configured to detect a presence of the mobile device at the charging device;
one or more light sources coupled to the housing and configured to emit a light beam for irradiating the solar cell, the solar cell being operable to convert the light beam to electricity for storage in a rechargeable battery of the mobile device;
a wall power adaptor configured to convert wall power to an electrical voltage supplied to the one or more light sources; and a control circuit communicatively coupled with the sensor and the one or more light sources and configured to:
activate, in response to the sensor detecting the presence of the mobile device, a light source of the one or more light sources;
receive, in response to the light source being activated, information from the mobile device indicating a characteristic of the solar cell based on placement of the solar cell in relation to the light source;
determine, in response to the information, whether the mobile device is correctly placed on the charging device or incorrectly placed on the charging device by monitoring a photogenerated current or voltage of the solar cell;
charge, in response to determining the mobile device is correctly placed on the charging device, the mobile device via the one or more light sources; and
indicate, in response to determining the mobile device is incorrectly placed on the charging device, to the mobile device that the mobile device is incorrectly placed on the charging device.

8. The charging device of claim 7, wherein the light beam comprises a mixture of infrared light and visible light.

9. The charging device of claim 7, wherein the light source comprises a GaAs-based light-emitting diodes (LEDs), and the solar cell comprising a GaAs solar cell.

10. The charging device of claim 9,
wherein the control circuit is further configured to enable the GaAs-based LEDs to transmit a communication light signal to the solar cell, wherein the communication light signal comprises a sequence of light pulses encoded in a binary form.

11. The charging device of claim 7,
wherein the sensor is further configured to detect decoupling of the mobile device with the housing, and wherein the control circuit is further configured to turn off the light source responsive to a signal sent from the sensor.

12. The charging device of claim 7, wherein the one or more light sources includes a plurality of additional light sources, and wherein the control circuit is further configured to selectively turn on one or more of the plurality of additional light sources based on a communication with the mobile device.

13. The charging device of claim 12, wherein the communication comprises second information regarding one or more of a product model of the mobile device, a type of the solar cell, a rechargeable battery usage status, an output light intensity from the light source, or a requested charging power for the mobile device.

14. The charging device of claim 7, further comprising:
an indicator coupled to the control circuit and configured to send an indication to users regarding a charging process status.

15. The charging device of claim 7, further comprising:
a network interface operable to communicate with the mobile device via a wireless network.

* * * * *